United States Patent [19]

Velenyi et al.

[11] 4,423,023

[45] Dec. 27, 1983

[54] PROCESS FOR THE PRODUCTION OF HYDROCYANIC ACID FROM CARBON MONOXIDE AND AMMONIA

[75] Inventors: Louis J. Velenyi; Harley F. Hardman, both of Lyndhurst; Fred A. Pesa, Aurora, all of Ohio

[73] Assignee: The Standard Oil Company, Cleveland, Ohio

[21] Appl. No.: 401,464

[22] Filed: Jul. 26, 1982

[51] Int. Cl.³ .................................................. C01C 3/02
[52] U.S. Cl. ...................................... 423/376; 502/185
[58] Field of Search ........................ 423/376; 252/447

[56] References Cited

U.S. PATENT DOCUMENTS

| | | | |
|---|---|---|---|
| 1,492,194 | 4/1924 | Beindl | 423/376 |
| 1,582,851 | 4/1926 | Mittasch et al. | 423/376 |
| 1,610,035 | 12/1926 | Bredig et al. | 423/376 |
| 1,626,848 | 5/1927 | Liebknecht | 423/376 |
| 1,627,144 | 5/1927 | Bredig et al. | 423/376 |
| 1,751,933 | 3/1930 | Lindner et al. | 423/376 |
| 1,920,795 | 8/1933 | Jaeger | 423/376 |
| 2,478,875 | 8/1949 | Merrill et al. | 423/376 |
| 2,861,870 | 11/1958 | Deyrup et al. | 423/376 |
| 3,244,479 | 4/1966 | Pan et al. | 423/376 |

FOREIGN PATENT DOCUMENTS

| | | | |
|---|---|---|---|
| 590468 | 1/1960 | Canada | 423/376 |
| 1107209 | 5/1961 | Fed. Rep. of Germany | 423/376 |
| 683511 | 11/1952 | United Kingdom | 423/376 |

*Primary Examiner*—Edward J. Meros
*Assistant Examiner*—Wayne A. Langel
*Attorney, Agent, or Firm*—Thomas P. Schur; Herbert D. Knudsen; Larry W. Evans

[57] ABSTRACT

A process for producing HCN by contacting CO and NH$_3$ with a catalyst comprising a porous catalyst support, a Group VIII metal which is at least one of Fe, Ni, Co and Ru, and carbon, wherein the metal is disposed on the pore surfaces of the support and the carbon is randomly bonded to the metal.

19 Claims, No Drawings

PROCESS FOR THE PRODUCTION OF HYDROCYANIC ACID FROM CARBON MONOXIDE AND AMMONIA

BACKGROUND OF THE INVENTION

This invention relates to the production of hydrocyanic acid (HCN) from carbon monoxide (CO) and ammonia ($NH_3$). More specifically, this invention relates to the production of HCN from CO and $NH_3$ in the presence of a catalyst comprising a noncarbonaceous, porous catalyst support, a catalytic Group VIII metal which is at least one of Fe, Ni, Co and Ru, and carbon, wherein the metal is disposed on the pore surfaces of the support and is randomly bonded to the carbon.

Belgian Patent No. 869,185 describes a novel catalytic material for use in the production of methane which comprises carbon fibers containing small nodules of iron or other Group VIII metals. This material is formed by contacting the Group VIII metal with a mixture of CO and hydrogen at an elevated temperature to cause deposition of carbon through the disproportionation of CO. When this material is contacted with hydrogen at an elevated temperature, the carbon in the material reacts with hydrogen to form methane.

U.S. Pat. No. 1,626,848, to Liebknecht, issued May 3, 1927, discloses a process for the production of HCN by reacting CO and $NH_3$ in the presence of a catalyst comprising a porous, nonacid charcoal. This porous, nonacid charcoal is an activated charcoal which may be used alone or in combination with other inert or catalytic substances such as metallic oxides. These oxides may be admixed with the charcoal or the charcoal may be impregnated or coated with the metallic oxide.

U.S. Pat. No. 1,751,933, to Lindner, issued Mar. 25, 1930, discloses a process for producing HCN by contacting $NH_3$ and CO with a catalyst comprising an iron carbide. This catalyst may be used alone or in conjunction with at least one of molybdenum, manganese, tungsten, cerium, titanium or copper, either in the free or combined state.

U.S. Pat. No. 1,598,707, to Bredig, et al., discloses a process for the production of HCN by reacting $NH_3$ and CO in the presence of a Group IVA or B carbide catalyst. U.S. Pat. No. 1,610,035, also to Bredig, et al., discloses a process for the production of HCN by reacting $NH_3$ and CO in the presence of a vanadium oxide. U.S. Pat. No. 1,627,144, to Bredig, et al. discloses a process wherein HCN is produced by the reaction of CO and $NH_3$ in the presence of Group III, IV, V and VI metal oxides. U.S. Pat. No. 1,634,735, to Bredig, et al., discloses a process for the production of HCN acid by reacting $NH_3$ and CO in the presence of a rare earth metal oxide catalyst.

As these references indicate, the formation of HCN by the reaction of CO and $NH_3$ in the presence of a catalyst has been known since the early 1900's. Although this reaction has the advantage of using low-cost materials as reactants, these early processes suffer from several limitations which are obviated or minimized by the process of the present invention. These limitations include the use of catalysts composed of materials, such as vanadium, which are relatively expensive. Also, catalysts which employ less expensive materials frequently result in inferior yields. In addition, previous catalysts often could not be recycled or displayed very limited life spans.

It was due in part to these limitations that the more recent processes produce HCN by reacting $NH_3$ with methane. Although this reaction may result in greater yields than the previous processes using $NH_3$ and CO, this reaction has the disadvantage of using an expensive component, i.e. methane, which has steadily increased in price to obtain a compound which relatively has maintained a low cost.

SUMMARY OF THE INVENTION

It is therefore an object of the present invention to provide a process for producing HCN by contacting CO and $NH_3$ with a catalyst comprising a noncarbonaceous, porous catalyst support, a catalytic Group VIII metal which comprises at least one of Fe, Ni, Co and Ru, and carbon, wherein the metal is disposed on the pore surfaces of the support and the carbon is randomly bonded to the metal.

It is a further object of the present invention to provide a process for producing HCN by contacting CO and $NH_3$ with a catalyst wherein the catalyst comprises a noncarbonaceous, porous catalyst support, a catalytic Group VIII metal which is at least one of Fe, Ni, Co and Ru, wherein the metal is disposed on the pore surfaces of the support, and carbon, wherein the carbon is substantially concatenated and randomly bonded to the metal.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

In general, the present invention provides a process for the preparation of HCN by contacting CO and $NH_3$ with a catalyst comprising a noncarbonaceous, porous catalyst support, a catalytic Group VIII metal which is at least one of Fe, Ni, Co and Ru, and carbon, wherein the metal is disposed on the pore surfaces of the support and is randomly bonded to the carbon.

DETAILED DESCRIPTION OF THE INVENTION

The reaction of CO and $NH_3$ to form HCN occurs in the gaseous phase and proceeds in the presence of a catalyst. This reaction may also produce small amounts of $H_2O$, $CH_4$, $H_2$, $N_2$ and possibly $CO_2$ as by-products. The molar ratio of CO to $NH_3$ may vary depending on the reaction conditions and the composition of the catalyst. It is preferred, however, that this ratio be about 1:1 to about 3:1 since greater product yields are obtained using an equal or excess quantity of CO.

The process of the present invention may also be performed in the presence of a diluent gas to minimize the degradation of $NH_3$ to various by-products, such as $N_2$ and $H_2$. The gases $N_2$, $H_2$, Ar, He and air are preferred for this purpose. It is also, preferred, however, that oxygen be excluded from the process since its presence tends to decrease HCN yields. Therefore $N_2$ and $H_2$ are especially preferred diluent gases since they are less reactive than air and less expensive than Ar and He. When a diluent gas is used, it is preferred that the diluent:$NH_3$ gas molar ratio be about 2:1 or less since a large proportion of diluent gas may cause the reaction of CO with $NH_3$ to proceed slowly.

The reaction of CO with NH₃ to form HCN may be performed at a variety of temperatures. When the process of the present invention is used, however, this temperature should be in the range from about 350° to about 600° C. Temperatures substantially below 350° C. may cause the reaction to proceed too slowly, while temperatures substantially higher than 600° C. may cause the removal of carbon from the catalyst in the presence of oxygen or may affect the carbon metal bonding. While the preferred temperature will depend somewhat on the exact composition of the catalyst and the molar ratios of the reactants, it is preferred that the process be performed at about 400° to about 500° C.

The process of the present invention may be performed at a variety of pressures. Pressures from about 0 to about 200 psi are preferred, and atmospheric pressure is especially preferred since this obviates the need for pressurizing or vacuum equipment. While pressure is not critical to the present invention, pressures substantially in excess of 200 psi may cause the removal of carbon in the presence of oxygen.

Many support materials may be employed to make the catalyst utilized in the present invention. This support material, however, should be noncarbonaceous. Therefore, support materials such as charcoal should not be used. it is preferred that the support material be porous silica ($SiO_2$), alumina ($Al_2O_3$), a mixture of $SiO_2$ and $Al_2O_3$, zirconia ($ZrO_2$) or titania ($TiO_2$). Porous $SiO_2$ or $Al_2O_3$ are, however, especially preferred, and porous $SiO_2$ is preferred in particular. Examples of suitable commercially available silicas are F-5 and F-7 silica, obtainable from the Akzochemie Corporation.

The size and shape of the catalyst may be varied consistent with the type of reactor used and to be otherwise convenient. In one embodiment of the invention, not necessarily preferred, the catalyst is particulate. When the catalyst is particulate, it is preferred that the support material has an average particle size of about 20 to 140 microns, and more preferrably about 45 to 90 microns. This allows for a particle size distribution and density of the catalyst which is appropriate for use in a fluid-bed reactor.

It is preferred that the pore volume of the support material be less than about 3 cc/gm since a pore volume substantially greater than 3 cc/gm may result in the support material being brittle. It is further preferred that the pore volume of the support material be at least about 0.4 cc/gm so that a catalytically significant quantity of carbon and metal may be deposited on the pore surfaces without blocking access of the reactants to the pore lumen.

When the catalyst is not particulate it is further preferred that the pore volume be about 1 to about 2 cc/gm to allow maximum loading of the pore with carbon and metal while allowing access of the reactants to the catalytic materials on the pore surfaces. When the catalyst is particulate, it is preferred that the pore volume of the support be about 0.6 to about 2.0 cc/gm, and more preferrably about 0.7 to 1.6 cc/gm. Pore volume may be measured by the mercury porousimeter technique which is described in H. N. Rootare and C. F. Prenzlow, "Surface Area for Mercury Porousimeter Measurements", *Journal of Physical Chemistry,* 71, 2733 (1967).

Although not required in the present invention, extremely small pores should be eliminated if possible since extremely small pores tend to fill up more rapidly with carbon and metal than do pores of a larger diameter. Therefore, it is preferred that porous support materials should be used which show no measurable pores of a diameter less than about 50 Å, and preferably about 80 Å and more preferably about 100 Å.

Although support materials with the preferred pore diameters and volumes may be commercially available, the pore diameters and volumes of other commercially available porous support materials may be adjusted consistent with the embodiments of the invention. One means of adjusting the pores of the support is by placing the support material in a dilute basic solution and subjecting it to elevated temperatures and pressure, followed by washing and drying.

The metal which is used in the present invention is a catalytic Group VIII metal which comprises at least one member selected from the group consisting of iron (Fe), nickel (Ni), cobalt (Co), and ruthenium (Ru). In this process iron and nickel are especially preferred. Iron, however, is most preferred. Various mixtures of these metals may also be used.

Although a slight proportion of the metal may be disposed on the outer surface of the catalyst support, the metal predominantly is disposed within the support, i.e. on the pore surfaces. This has the advantage of making the catalyst more attrition resistant than catalysts werein the metal is disposed only on the outer surface or wherein the catalyst is simply an admixture of catalytic materials.

The catalytic Group VIII metal may be disposed on the surfaces of the pores by metal impregnation. Although theoretically there is no maximum amount that the support may be metal impregnated, too much metal may fill the pores of the support, thereby reducing the catalytic sites available. Conversely, too little metal may cause the catalyst to exhibit inferior catalytic activity.

The amount of metal in the catalyst may be expressed in terms of the percent metal loading of the support. The percent metal loading can be obtained by the following formula:

$$\text{Percent metal loading} = \frac{\text{weight deposited metal}}{\text{weight support} + \text{weight metal}} \times 100$$

wherein the weight of the metal-containing support is the sum of the weight of the support plus the weight of the deposited metal in its reduced form.

While a percent metal loading of about 8 to 30 is preferred, a percent metal loading of about 10 to 20 is especially preferred.

In making the catalyst the porous support is impregnated or coated with the catalytic Group VIII metal using any one of several conventional impregnation techniques. One such technique is that of impregnating the porous support with a liquid mixture of the metal or a compound thereof, such as a metal salt like cobalt acetate, $FeCl_3$ or $Fe(NO_3)_3 \cdot H_2O$. This usually will be followed by drying and, if necessary, heat treating in an appropriate atmosphere or series of atmospheres, such as air followed by $N_2$ followed by $H_2$. In this way the metal is deposited on the pore surfaces in either its elemental form or in a substantially reduced state. For example, when Fe is used as the Group VIII metal it may be deposited on the support as either Fe or $Fe^{2+}$.

Carbon is deposited onto the catalyst support, preferably in the absence of oxygen, by passing a carbon-containing gas over the metal impregnated support material. The carbon in this gas preferrably is in the form of CO, $CO_2$ or a saturated or unsaturated hydrocarbon of up to five carbon atoms, such as methane, although higher hydrocarbons which are in the vapor phase under the carbon deposition conditions may be used. CO, however, is preferred. The carbon-containing gas may also contain compounds that are unreactive under the deposition conditions, such as molecular hydrogen and nitrogen.

While this gas may be passed over the support at a temperature of about 350° to 600° C., it is preferred that the temperature be about 400° to 550° C. While the carbon may be deposited on the support at a variety of pressures of less than about 200 psi, deposition occurs best at pressures which are near atmospheric. Pressures substantially in excess of 200 psi may prevent carbon from remaining deposited on the support.

Carbon which is deposited onto the metal impregnated catalyst support becomes chemically bonded to the metal. Unlike carbides which have definite, ordered chemical structures, this carbon/metal bonding occurs at random, thereby forming a carbon/metal complex which cannot be expressed by a general chemical formula. In addition to being bonded to the metal, some carbon atoms may also become chemically bonded or concatenated to other carbon atoms on the catalyst support, causing the formation of carbon fibers in which the metal is randomly incorporated by bonding. This random metal/carbon complexing causes the metal to display increased activity over metal/carbon admixtures or carbides.

The amount of carbon on the catalyst support may be expressed in terms of percent carbon loading of the metal-containing catalyst support. The percent carbon loading of the catalyst can be obtained by the following formula:

$$\text{Percent carbon loading} = \frac{\text{weight deposited carbon}}{\text{weight support + weight metal}} \times 100$$

where the weight of the metal-containing support is the sum of the weights of the support and the deposited metal.

The appropriate percent carbon loading will depend in part on the pore volume of the catalyst support. It is preferred that the percent carbon loading be about 5 to 50 percent. It is further preferred, however, that the percent carbon loading be about 20 to 30 percent. While greater percentages of carbon loading may not necessarily negatively affect catalyst activity, carbon loading above 50 percent may cause filling of the pores. Not only may filling of the pores reduce the catalyst surface area available to the reactants, but it may also result in breaking of the support material since the carbon in the pores may exert an expansive force.

While not necessary to the process of the present invention, the catalyst may also comprise at least one promoter. This promoter may be at least one of Re, Zn, Mn, Hg, Sn, Bi, La, U, Th, Ce, In, Tl, an alkaline earth metal, and a Group IB, IVB, VB, VIB, or VIII metal, and mixtures thereof, as defined by The Condensed Chemical Dictionary, 10th Ed., G. G. Hawley, Van Norstrand Reinhold Co., New York, 1981. This promoter may be present in a metal:promoter molar ratio of up to about 1:0.99. These promoters may be incorporated into the catalyst before carbon is deposited onto the catalyst support by placing them in solution with the catalytic Group VIII metal, which is then contacted with the support and calcined. These promoters may also be incorporated in a step-wise fashion, either before or after the catalytic Group VIII metal has been incorporated into the support, but before the deposition of carbon.

It is important to note that although the catalytic Group VIII metal may be substantially reduced during catalyst preparation, before deposition of the carbon, the catalyst which is used in the process of the present invention need not be fully reduced. When the catalyst is not fully reduced oxygen may be present in a quantity sufficient to satisfy the valence requirements of the nonoxygen catalyst components.

SPECIFIC EMBODIMENTS

Experiments were performed to demonstrate the present invention by embodying different aspects of the invention or by providing a basis for comparison.

The catalyst used in these experiments was prepared using the procedure described below. In order to adjust the pores of the support to the desired configuration, a commercially available, particulate porous silica was placed in a glass autoclave lining with a dilute aqueous $K_2CO_3$ solution. The autoclave was then brought to 230° C. and maintained at that temperature for thirty minutes at a pressure of 400 psig. After thirty minutes the autoclave was rapidly cooled. The silica was then removed from the autoclave and washed three times with distilled water. The silica was then dried overnight in air at 110° C. This method yielded a porous silica product with a pore volume of approximately 1.22 cc/gm and no measurable pores of diameter less than 150 Å when measured by the mercury porousimeter technique.

A catalytic Group VIII metal was then disposed on the support by the following technique. $Fe(NO_3)_3.9-H_2O$ (obtainable from Fisher Scientific Company), 76.6 gm, was dissolved in 115 ml of distilled water. The solution was slowly added to 60.0 gm hydrothermally treated porous $SiO_2$ (obtained by the procedure described above) with constant stirring. There was no excess liquid when the addition to $SiO_2$ was complete. The catalyst was dried overnight at 115° C. The catalyst was then calcined in air at 550° C. for three hours, and then at 650° C. for one hour to decompose the iron nitrate to iron oxide. The catalyst was then placed in a quartz fluid-bed reactor and reduced with $H_2$ at 550° C. for ninety minutes and at 650° C. for thirty minutes in order to reduce the oxidized iron to a substantially elemental state. The catalyst was then cooled to room temperature and removed from the reactor.

Other techniques for depositing the catalytic Group VIII metal may be employed. For example, organic compounds such as iron carbonyl or phenyl iron dissolved in an organic solvent such as n-pentane may be employed as the impregnating solution. Inorganic salts of the catalytic Group VIII metals dissolved in organic solutions may also be used.

The process of the present invention may be performed by either a single $CO/NH_3$ pass over the catalyst or by a plurality of passes. Results may therefore be reported either as total yield or as the conversion of a reaction to product obtained on a single pass. Percent per pass conversion (ppc) as used herein denotes the percent of $NH_3$ converted to HCN in a single pass of $CO/NH_3$ over the catalyst.

These experiments were performed by passing the reactants over the catalyst for a period of 15 minutes. Product analysis was performed using gas chromatography.

Example 1 was performed to demonstrate an embodiment of the invention.

EXAMPLE 1

Example 1 was performed using 12.72 gm of an $SiO_2/Fe/C$ catalyst comprising an $SiO_2$ porous catalyst support with approximately 15 percent Fe loading and 23 percent carbon loading. The reaction was performed at 500° C. and atmospheric pressure with nitrogen as the diluent gas. The $CO/NH_3/N_2$ molar ratio was approximately 2:1:1. CO, $NH_3$ and $N_2$ were passed over the catalyst at a rate of 98 cc/min, 50 cc/min and 49 cc/min, respectively. A per pass conversion of 13.60 percent was obtained.

The experiment described in Example 2 was performed to provide a basis for comparing the HCN yield obtained in Example 1 embodying the present invention versus the yield obtained using the same catalyst wherein carbon is omitted.

EXAMPLE 2

Example 2 was performed under the same conditions as Example 1 using 12.65 gm of an $SiO_2/Fe$ catalyst with an $SiO_2$ porous catalyst support with approximately 15 percent Fe loading. A per pass conversion of 8.13 percent was obtained.

The experiment represented in Example 3 was performed to demonstrate that the carbon contained in the catalyst is not a reactant in the process of the present invention.

EXAMPLE 3

Example 3 was performed using the same reaction conditions and catalyst described in Example 1. In this experiment, however, $CO_2$ was substituted for CO. No detectable HCN was obtained.

The experiments described in Examples 4 and 5 were performed to demonstrate that although air may function as the diluent gas in this invention, a non-oxygen containing gas such as nitrogen is preferred.

EXAMPLE 4

Example 4 was performed using the procedure outlined above. The catalyst had an $SiO_2$ porous support with approximately 15 percent Fe loading and 23 percent carbon loading. The reaction was performed at 400° C. and atmospheric pressure using 12.72 gm of the catalyst and air as the diluent gas. The $CO/NH_3/air$ ratio was approximately 2:1:1. CO, $NH_3$ and air were passed over the catalyst at a rate of 98 cc/min, 50 cc/min and 50 cc/min, respectively. An HCN yield of 4.85 percent ppc was obtained.

EXAMPLE 5

Example 5 was performed using the procedure and conditions described above in Example 4, using $N_2$ as the diluent gas. A 5.02 percent ppc to HCN was obtained.

The experiments of Example 6 through 9 were performed to demonstrate the effect of temperature on the process of the present invention. The catalyst had an $SiO_2$ porous support with approximately 15 percent Fe loading and 23 percent carbon loading. Air was used as the diluent gas, with a $CO/NH_3/air$ ratio of approximately 2:1:2. CO, $NH_3$ and air were passed over 12.72 gm of the catalyst at a rate of 98 cc/min, 50 cc/min and 90 cc/min, respectively. The results of these experiments are summarized below in Table I. A comparison of the results of Examples 1 and 5, however, indicates that the optimum temperature may differ slightly depending on which diluent gas is used.

TABLE I

| Example No. | Temp. °C. | Percent ppc HCN |
| --- | --- | --- |
| 6 | 350 | 1.06 |
| 7 | 400 | 3.34 |
| 8 | 450 | 3.89 |
| 9 | 500 | 2.02 |

These examples have been presented only to demonstrate operability and certain aspects of the present invention. The scope of the present invention is not limited to these above embodiments, but includes equivalent embodiments and modifications as defined by the following claims:

We claim:

1. A process for producing HCN by contacting CO and $NH_3$ with a catalyst comprising a noncarbonaceous, porous catalyst support, a Group VIII metal which comprises at least one member selected from the group consisting of Fe, Ni, Co and Ru, and carbon, wherein the metal is disposed on the pore surfaces of the support and the carbon is randomly bonded to the metal, the catalyst having from about 8 to about 30 percent metal loading and from about 5 to about 50 percent carbon loading.

2. A process for producing HCN by contacting CO and $NH_3$ with a catalyst comprising a noncarbonaceous, porous catalyst support, a Group VIII metal which comprises at least one member selected from the group consisting of Fe, Ni, Co and Ru, wherein the metal is disposed on the pore surfaces of the support, and carbon, wherein the carbon is substantially concatenated and is randomly bonded to the Group VIII metal, the catalyst having from about 8 to about 30 percent metal loading and from about 5 to about 50 percent carbon loading.

3. The process of claim 1 or 2 wherein the support has a pore volume of about 0.4 to about 3 cc/gm.

4. The process of claim 1 or 2 wherein the support has a pore volume of about 1 to about 2 cc/gm.

5. The process of claim 1 or 2 wherein the catalyst is particulate.

6. The process of claim 3 wherein the catalyst has an average particle size of about 20 to 140 microns.

7. The process of claim 4 wherein the catalyst has an average particle size of about 45 to 90 microns.

8. The process of claim 5 wherein the support has a pore volume of about 0.6 to about 2 cc/gm.

9. The process of claim 1 or 2 wherein the metal is iron or nickel.

10. The process of claim 9 wherein the metal is iron.

11. The process of claim 1 or 2 wherein the catalyst additionally comprises at least one of Re, Zn, Mn, Hg, Sn, Bi, La, U, Th, Ce, In, Tl, an alkaline earth metal, a Group IB, IVB, VB, VIB and VIII metal.

12. The process of claim 1 or 2 wherein the support is selected from the group consisting of $SiO_2$, $SiO_2$ and $Al_2O_3$, $Al_2O_3$, $ZrO_2$ and $TiO_2$.

13. The process of claim 12 wherein the support is $SiO_2$.

14. The process of claim 1 or 2 wherein the CO:NH$_3$ molar ratio is about 1:1 to about 3:1.

15. The process of claim 1 or 2 wherein CO and NH$_3$ are contacted with the catalyst in the presence of a diluent gas selected from the group consisting of N$_2$, H$_2$, Ar, He and air.

16. The process of claim 15 wherein the diluent:NH$_3$ gas molar ratio is about 2:1 or less.

17. The process of claim 1 or 2 wherein the process is performed at a pressure of about 0 to about 200 psi.

18. The process of claim 1 or 2 wherein the process is performed at a temperature of about 350° to about 600° C.

19. A process for producing HCN by contacting CO and NH$_3$ in a molar ratio of about 1:1 to about 3:1 with a particulate catalyst comprising a noncarbonaceous, porous catalyst support, said catalyst support having an average particle size of about 45 to about 90 microns and a pore volume of about 0.4 to about 3.0 cc/gm, the support being selected from the group consisting of SiO$_2$, SiO$_2$ and Al$_2$O$_3$, AlO$_3$, ZrO$_2$ and TiO$_2$, said catalyst additionally comprising at least one metal selected from the group consisting of Fe, Ni, Co and Ru which is disposed on the pore surfaces of the support, and carbon which is substantially concatenated and randomly bonded to the metal, the catalyst having about 8 to 30 percent metal loading and about 5 to 50 percent carbon loading, said process being performed at a pressure of about 0 to about 200 psi and a temperature of about 350° to about 600° C.

* * * * *